J. E. HARRISON.
TRACTION WHEEL.
APPLICATION FILED MAY 6, 1916.

1,211,578.

Patented Jan. 9, 1917.

INVENTOR:
J. E. Harrison.
BY his ATTORNEY:
A. M. Carlsen.

UNITED STATES PATENT OFFICE.

JESSE E. HARRISON, OF MADISON, SOUTH DAKOTA.

TRACTION-WHEEL.

1,211,578.

Specification of Letters Patent.　　Patented Jan. 9, 1917.

Application filed May 6, 1916.　Serial No. 95,941.

*To all whom it may concern:*

Be it known that I, JESSE E. HARRISON, a subject of the King of Great Britain, residing at Madison, in the county of Lake, and State of South Dakota, have invented a new and useful Traction-Wheel, of which the following is a specification.

This invention relates to traction wheels for tractors or any other kind of motor vehicles; and the object is to provide a traction wheel which is improved in several respects, as will hereinafter be described and pointed out in the appended claims and illustrated in the accompanying drawing, in which:—

Figure 1:
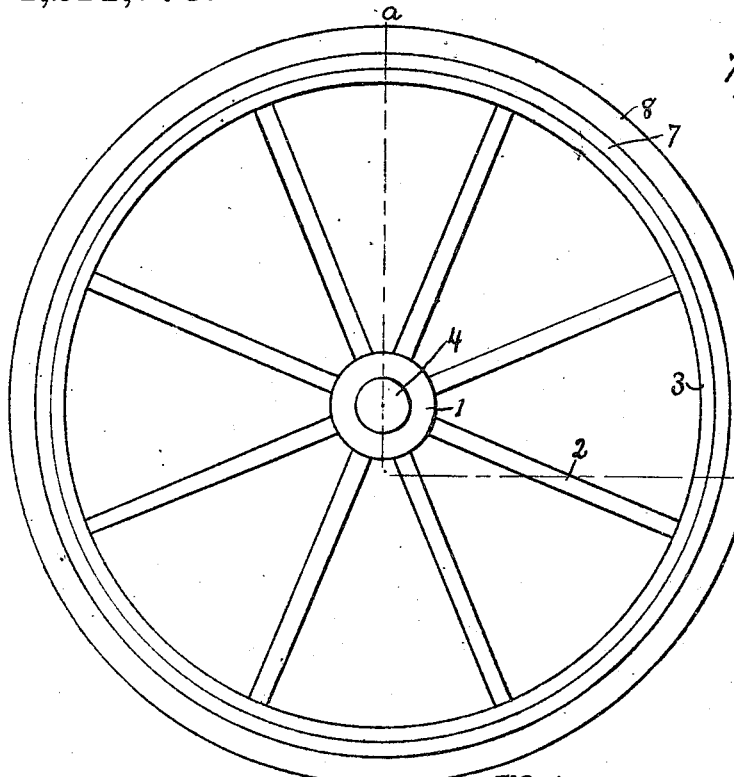
Figure 3:
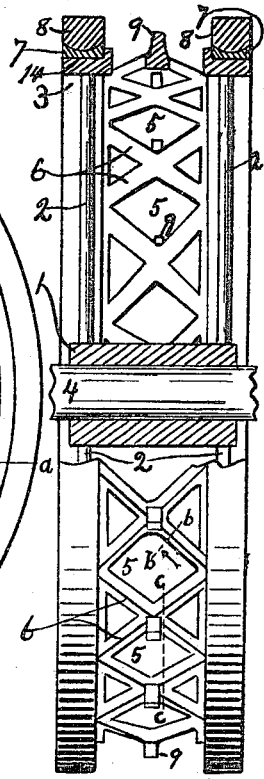
Figure 2:
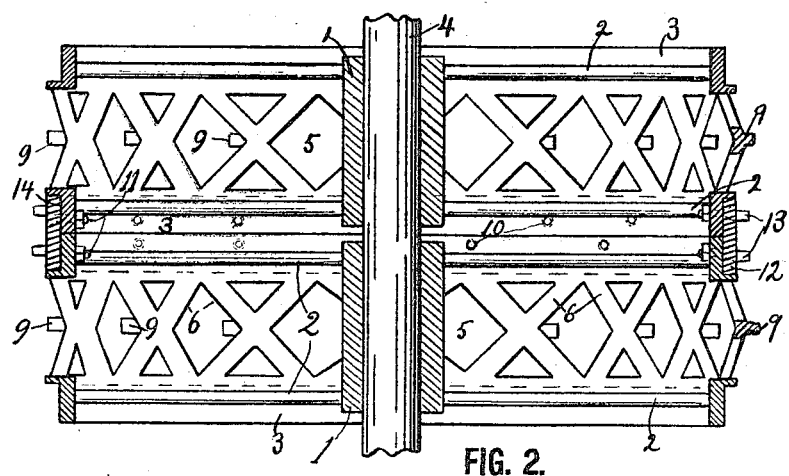
Figure 4:
Figure 5:
Figure 6:

Figure 1 is a side elevation of my improved traction wheel in a general way. Fig. 2 is a substantially diametrical section of the wheel in its duplex form. Fig. 3 is a section on the line *a—a* Fig. 1 of the wheel in its single form. Fig 4 is an enlarged cross section on the line *b—b* Fig. 3. Fig. 5 is a modification of Fig. 4. Fig. 6 is a section on the line *c—c* Fig. 3.

Referring to the drawing by reference numerals, 1 designates the hub, 2 the spokes and 3 the felly or ring of a metallic wheel, which may be made single as in Fig. 3 for light work or small tractors, or in duplex form as in Fig. 2. In the latter case the wheel may be considered as one single wheel composed of two sections, each of which may have an individual hub either rotated on or secured to rotate with an axle 4; or the outer ends of each hub may serve as journals for the wheel.

Each wheel section or single wheel has its felly 3 skeletoned by apertures 5 which may be of rectangular form as in Figs. 2 and 3, or circular as at 5ˣ in Fig. 6. The twofold advantage of this construction is that the apertures permit free escape of the earth which in soft ground crowds into the wheel from the sides of it, and the margins 6 between the apertures, whether of the shape shown in Fig. 4 or that in Figs. 5 and 6, constitute good cleats or calks for taking hold of the ground.

In Figs. 1 and 3 is shown how either a single or duplex wheel may have the outer edges of its felly provided with removable rims 7 and rubber tires 8, for driving on streets or roads paved with asphalt or other surface apt to get damaged from the cleats 6, and when driving in the country on rough roads or on farm land, the tires and rims may be removed, as in Fig. 2.

The single wheel in Fig. 3, or each section in Fig. 2, may be provided with sprocket teeth 9 adapted to be engaged by an endless sprocket chain (not shown) driven from the motor of the vehicle. But in the duplicate form shown in Fig. 2, the fellies of the two sections are brought close together and secured by screws 10 or bolts 11 to a ring 12 having sprocket teeth 13 for a duplex drive chain to engage, said ring 12 being placed about the reduced portions 14 of the felly. Said ring 12 may preferably be made in two semicircular sections so as to be secured in the recess of the wheel without separating the wheel sections when the ring may need to be repaired or replaced by a new one, or when the wheel sections are secured on the shaft 4 and the latter is driven by a sprocket or other operative connection (not shown) with the motor.

What I claim is:—

1. A traction wheel having its face skeletoned by apertures and the margins between the apertures designed for cleats or calks to take hold of the ground, said wheel being composed of two wheel-shaped sections having adjacent reduced portions creating a peripheral recess, a ring detachably secured in said recess and provided with sprocket teeth.

2. A traction wheel having its face skeletoned by apertures and the margins between the apertures designed for cleats or calks to take hold of the ground, said wheel being composed of two wheel shaped sections having adjacent reduced portions creating a peripheral recess, a ring detachably secured in said recess and provided with sprocket teeth and sprocket teeth upon each section, to enable each section to be used as an individual traction wheel when so desired.

In testimony whereof I affix my signature.

JESSE E. HARRISON.

Copies of this patent may be obtained for five cents each, by addressing the "Commissioner of Patents, Washington, D. C."